Sept. 18, 1951 J. E. VISTAIN, JR 2,568,671

PICKUP ARM

Filed Dec. 7, 1948 3 Sheets-Sheet 1

INVENTOR.
James E. Vistain Jr.
BY
J. D. Douglas
Att'y.

Sept. 18, 1951 J. E. VISTAIN, JR 2,568,671

PICKUP ARM

Filed Dec. 7, 1948 3 Sheets-Sheet 2

INVENTOR.

James E. Vistain Jr.

BY J. D. Douglas

Att'y.

INVENTOR.
JAMES E. VISTAIN JR.
BY J. D. Douglas

Patented Sept. 18, 1951 2,568,671

UNITED STATES PATENT OFFICE 2,568,671

PICKUP ARM

James E. Vistain, Jr., Chicago, Ill., assignor to Admiral Corporation, Chicago, Ill., a corporation of Delaware Application December 7, 1948, Serial No. 64,020

10 Claims. (Cl. 274—23)

This invention relates to phonograph pickup apparatus, and particularly to a pickup arm capable of reproducing two classes of records, the respective classes differing from each other principally in the size and pitch of their sound grooves and the speed at which they are commonly rotated when reproduced; additionally, the invention comprehends novel control means in connection with the pickup arm, by which it may be alternately adapted for operative engagement with the two classes of records.

Although no difficulty is experienced in playing, by equipment of known construction, conventional phonograph records, i. e., records which are rotated at a speed of 78.26 R. P. M. while engaged by a needle having a radius at the tip thereof of .003 or .004 of an inch when the needle is pressed against the records with a pressure of from 20 to 30 grams, it is impossible with this equipment to play records of the slow-speed long-playing variety. For instance, there are now on the market fine groove records known to the trade as "micro-groove records," which can be reproduced effectively only by a needle having at the point thereof a radius of about .001 of an inch. The needle is held in engagement with the sound groove with a pressure of 5 or 6 grams, while the records are rotated at a speed of 33⅓ R. P. M. Nor is it possible to play a conventional sound grooved record properly with a needle adapted for engagement with a microgroove record. Therefore, in order that a record player may be used for reproduction of both kinds of records, record players have been made with two pickup arms, one adapted to engage microgroove records and the other pickup arm adapted to engage the conventional records. This, of course, involves duplicate parts thereby adding to the cost of manufacture of the record player.

By my present invention I am able to play both conventional and microgroove records by the agency of but one pickup arm. I therefore derive the advantage of two pickup arms together with the simplicity of operation of a single pickup arm machine, and with a consequent material saving in the cost of manufacture of a record player in which my invention is incorporated.

In order that the foregoing advantages may be realized, I provide a pickup arm with a transducer having a pair of needles extending therefrom. One of the needles is adapted to engage a fine groove, long playing or microgroove record which is adapted to be played while rotated at a speed of 33⅓ R. P. M. The other of the two needles is adapted to engage coarse grooved or ordinary records adapted to be played while rotated at a speed of 78.26 R. P. M. and which will be referred to hereinafter as a "conventional record." The tips of the needles extend for substantially the same distance from the transducer which is movably coupled to the pickup arm and thereby the needles are adapted to be extended alternately to a position in which each is adapted to engage a record. Additionally, the invention involves a simple control by the operation of which the needles are simultaneously moved in opposite directions for extension of the needle appropriate for the class of record to be engaged thereby while at the same time that the needles are thus moved the center of gravity of the pickup arm is also shifted with respect to its horizontal pivotal axis so that the pressure of the needle, due to gravity, on a record is in accordance with the requirements of the record to be played by the needle so extended.

Other advantages of the invention will be apparent from the following specification when considered in conjunction with the accompanying drawings in which.

Figure 1:
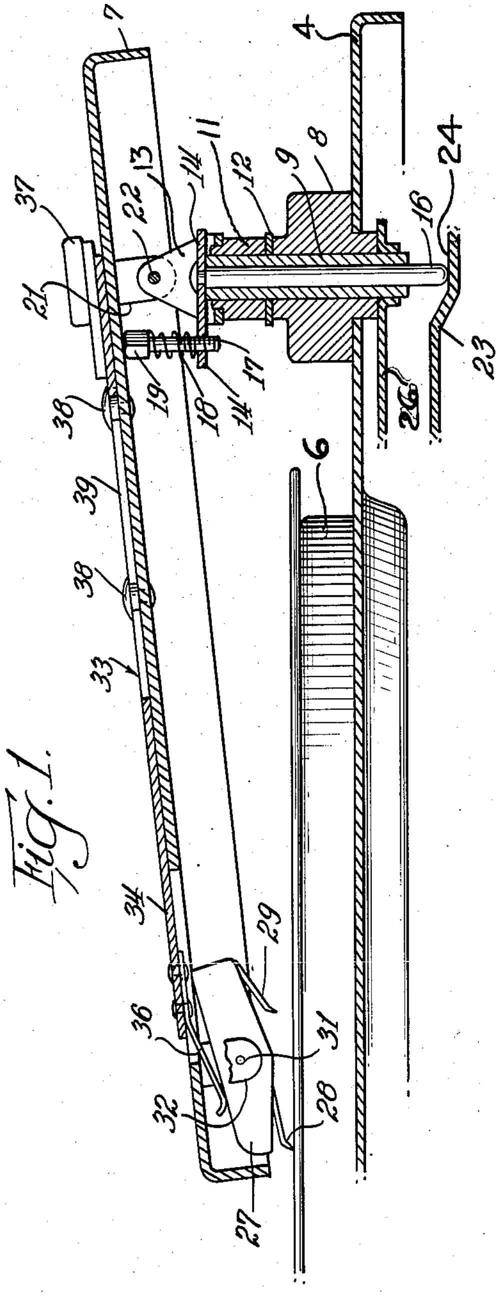
Fig. 1 is a view of the invention in side elevation, parts of the mechanism being broken away to reveal the structure of underlying parts.

In Fig. 1, wherein for the purpose of illustration, is shown the first embodiment of the invention, the reference character 4 is used to denote a frame or housing for a phonograph record player on which is rotatably mounted a conventional turntable 6 over which a pickup arm 7 is adapted to swing. Support for the arm 7 includes a pedestal 8, fixed to the frame 4 in any suitable manner, in which is journalled a vertical tubular shaft 9. The shaft 9 carries, at the top thereof, a collar 11 which, due to its bearing relationship with the pedestal 8 or with a washer 12 between the pedestal and collar, is adapted to resist downward displacement of shaft 9. The collar 11 includes bifurcated means including a pair of arms 13 extending upwardly, between which a mobile bracket 14 is supported on the upper end of a lift rod 16 slidably journalled in the tubular shaft 9. Threaded in the free end of bracket 14 is an adjustment screw 17 adapted to engage the under side of the pickup arm and which may be maintained in its position of adjustment with respect to the bracket 14 by a compression spring 18 between said bracket and a head 19 of the screw 17.

The pickup arm 7 is tiltably journalled on the arms 13 by means of a pin 22 which extends through the arms and through ears 21 which extend downwardly from the inner surface of the pickup arm. The arm is therefore adapted to be rocked about a horizontal axis by vertical movement of the lift rod 16.

Means to manipulate the pickup arm automatically comprises, in addition to the lift rod, a lift cam 23 including a dwell portion 24 against which the lift rod 16 rests while a record is being reproduced. When the record is rejected, however, the cam 23 is slid horizontally to the right under the lift rod which is thereby moved axially upward. Concurrently, the screw 17, engaging the pickup arm, swings said arm about the pin 22 and out of engagement with a record on the turntable 6. Also an arm 26, secured to the lower end of shaft 9, may also be moved by means, not shown, to swing the pickup arm about a vertical axis provided by the shaft 9.

Control means is provided for extending one of the needles and concurrently retracting the other of the needles. Said means also provides for concurrently shifting the center of gravity of the pickup arm with respect to its horizontal pivotal axis; that is, the axis provided by the pin 22 as one of the needles is extended or retracted.

In order that the foregoing operations may be realized I provide a transducer 27 having a needle 28 adapted for playing conventional grooved records and a needle 29 adapted for playing microgrooved records. The transducer is provided with a pintle 31 on opposite sides thereof. The pintles are pivotally supported in any suitable manner from the pickup arm such as by a pair of fingers 32 thereon in which the pintles are journalled. To govern the position of the needles 28 and 29 I provide a slider mechanism 33. It comprises a rigid and preferably flat rod 34, to one end of which a resilient member, preferably taking the form of a leaf spring 36, is rigidly attached while at the opposite end thereof the rod bears a handle 37 by which the slider mechanism is adapted to be moved with respect to the pickup arm. The slider mechanism is slidably anchored to the pickup arm by means including a pair of spaced-apart shouldered rivets 38 carried by the pickup arm 7. Both of the rivets 38 are received within a slot 39 in the rod 34, the mobility of the mechanism 33 being thereby limited.

Figure 2:
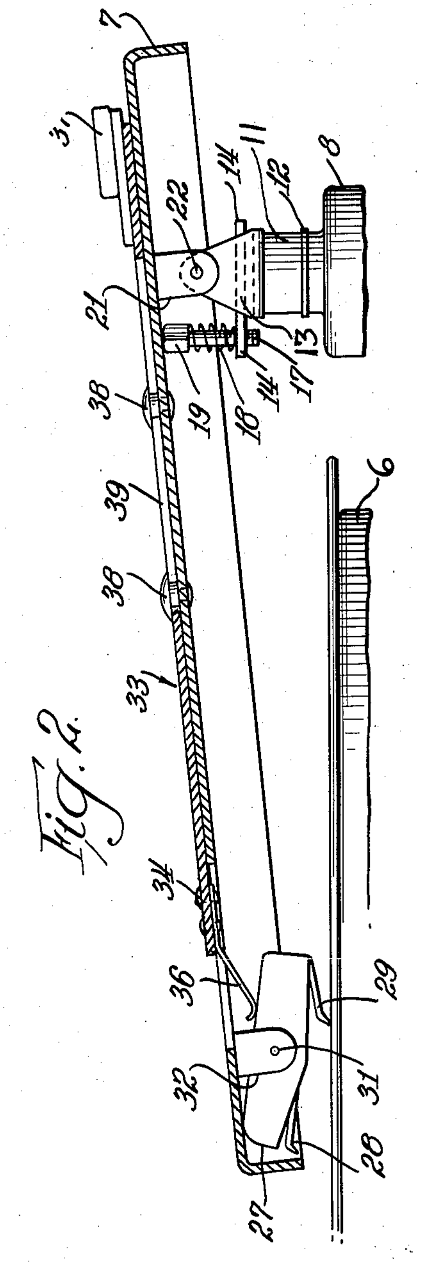
Fig. 2 is another view corresponding to Fig. 1, parts being in another position.

The spring 36 is constantly deflected by engagement with the transducer 27. In the course of its motion, by manually moving the handle 37, the point of engagement of spring 36 with the transducer is shifted through and beyond a region between the fingers 32 beyond which the spring pressure causes the transducer to rock about pin 31 to an extent limited by the pickup arm as will be noted (Figs. 1 and 2). In both of these extreme positions the force of spring 36 is adequate, without further deflection thereof, to retain transducer 27 in either of its extreme positions while the pickup arm is supported by a record of either class. Furthermore, spring 36 is adapted to provide cushioning means for the weight of the pickup arm while a record is being played.

The handle 37 is sufficiently heavy to play the role of a counterweight to such an extent that when it is moved to the extreme left (Fig. 1) accompanied by extension of needle 28, then the center of gravity of the pickup is of such a distance from pin 22 that needle 28 is pressed against a record with a pressure of the order of 10 or 20 grams. When, however, the handle 37 is shifted to the extreme right, the needle 28 being then retracted and needle 29 extended, then the center of gravity is shifted toward a point sufficiently close to the pin 22 that needle 29 engages a record with a pressure of approximately 5 or 6 grams.

Figure 3:
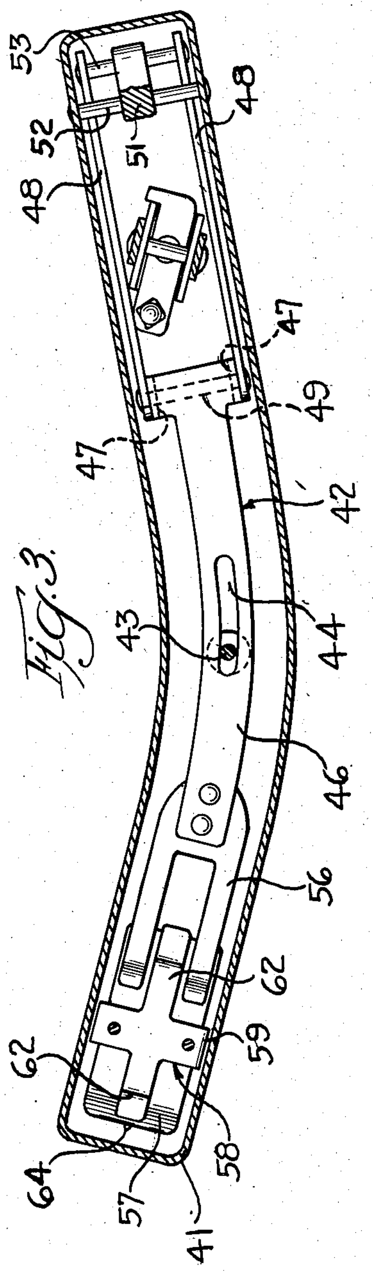
Fig. 3 is a top plan view of a second embodiment of the pickup arm, the top wall thereof being broken away to reveal the structure of other mechanism.
Figure 4:
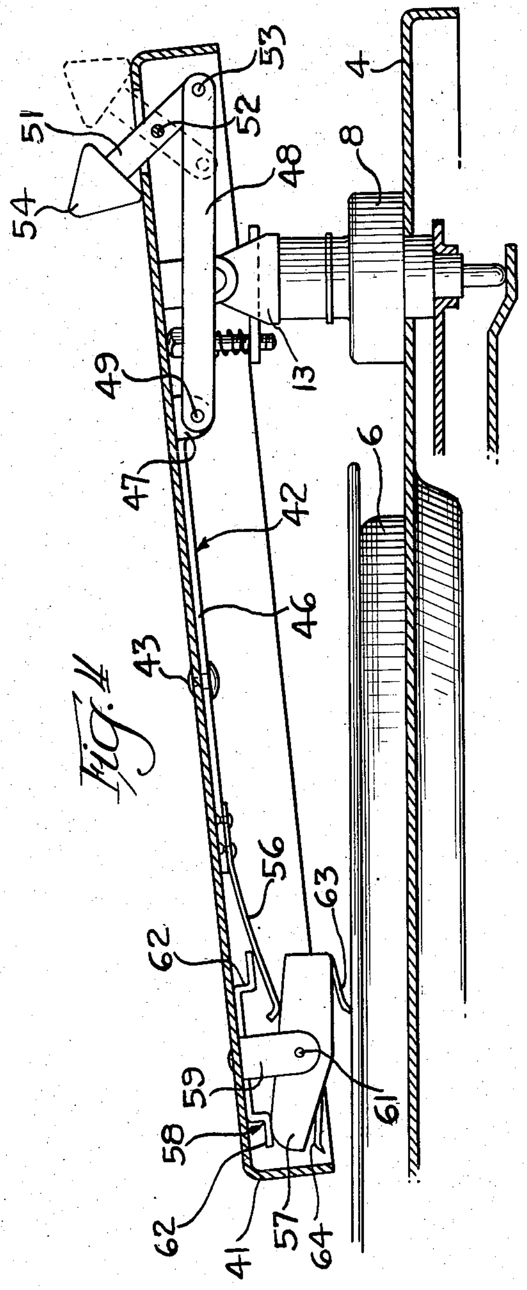
Fig. 4 is a side view of the second embodiment of the pickup arm one of the side walls of which is broken away to reveal other mechanism as viewed in elevation.

While I have shown, in Figs. 1 and 2, specific mechanism for carrying out my idea I may also use other mechanism as indicated in the modification depicted in Figs. 3 and 4. Therein, a pickup arm 41 as shown supported by the same mechanism indicated in Figs. 1 and 2. A slider mechanism 42 is slidably anchored to the inner side of the pickup arm by a headed stud 43, the stud being fixed to the pickup arm and slidably received in a slot 44 in a substantially rigid rod 46 of the slider mechanism. At one end thereof, the rod 46 bears downwardly extending ears 47 to which a pair of links 48 are pivotally attached by a pin 49. Adjacent the outer end of the pickup arm 41 is pivoted a control lever 51 by means of a pin 52 the ends of which are supported by the pickup arm. An additional pin 53 passes through the lower end of the control lever 51 to pivotally couple the same to the links 48 while by means of a handle 54, suitably attached to the upper end thereof, the lever may be swung about pivot 52 to move the slider mechanism between either of its two extreme positions. The handle 54, however, is of substantial weight so that the center of gravity of the pickup arm is shifted as the handle is moved from its position indicated by broken lines. The remaining end of rod 46 bears a leaf spring 56, one end of which constantly presses downwardly against a transducer 57. The transducer 57 is rockably supported from the inner end of pickup arm 41 by a spider 58, downwardly extending arms 59 of which embrace opposed sides of the transducer which is pivotally secured to the arms by pintles 61 projecting outwardly therefrom and through said arms. Additionally, the spider 58 may include longitudinally extending arms 62 to limit rocking of the transducer 57 about its axis provided by the pintles 61.

The transducer 57 carries a stylus 63 adapted to engage standard grooved records and a stylus 64, adapted to engage microgroove records. In order that the needle 64 may engage a record, and needle 63 be concurrently retracted, counterweight 54 is swung about pin 52 from its full line to its broken line position, thereby also lessening the pressure of engagement of the record by the needle 64.

While the arrangement of the needles 63 and 64 is the reverse of needles 28 and 29, i. e., the position of the fine groove and coarse groove needles with respect to the inner extremity of the pickup arm, I also contemplate the possibility of no reversal of the needles which would follow pivoting to the pickup arm the lever 51 at the lower end thereof and pivotally attaching the link 48 to the lever at a point thereon between the handle 54 and axis about which lever 51 is adapted to swing.

Figure 5:
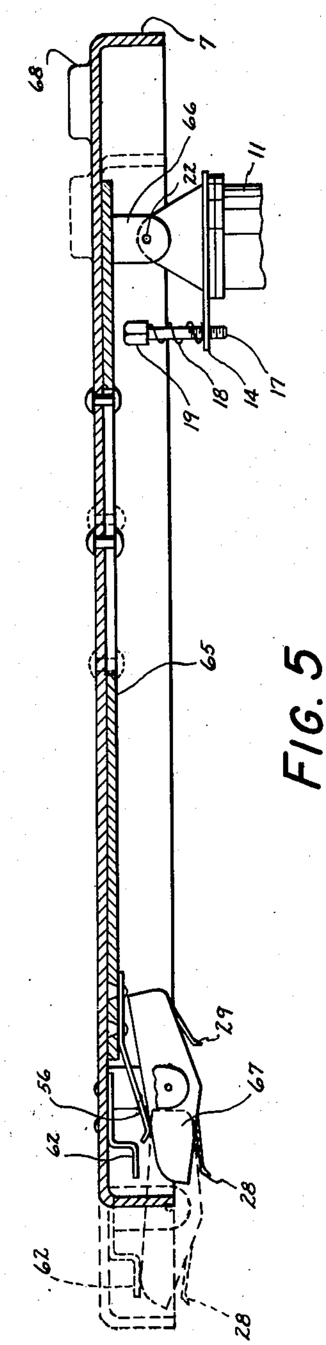
Fig. 5 is a view similar to Fig. 4, showing a third embodiment of my invention.

It is also conceived that the relative motion between the leaf spring 36 and the transducer 27 be obtained by moving the pickup arm while holding the slider. In this embodiment (Fig. 5) the slider 65 is similar to that of Fig. 4 except that it is somewhat longer and carries the ears 66 which are journalled on the pin 22 as before. The slider also still carries the leaf spring 56 and is slidably fastened to the pickup arm as in the second embodiment described above. The pickup arm also carries a transducer 67 which is exactly the same as the transducer 27 in Figs. 1 and 2. Stops 62 for positioning the transducer may also be provided, and the arm may carry a counterweight 68.

Figure 7:
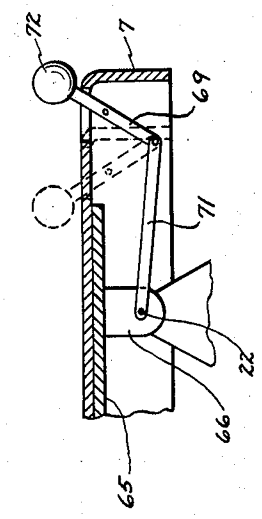
Figs. 6 and 7 are detailed side views showing the application of counterweight levers to my third embodiment.
Figure 6:
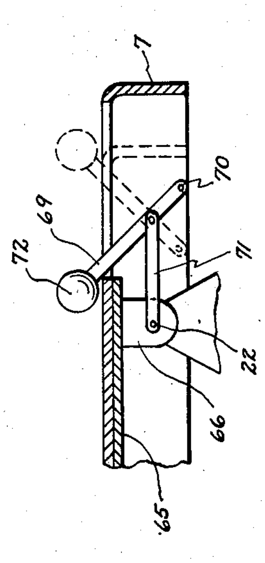

In this embodiment, the arm itself carrying the transducer is moved and shifts the counterweight toward or away from the pivot point. Additionally, the transducer 67 is moved and under the influence of the leaf spring 56 is rocked, thereby alternately positioning the needles for engagement with the different classes of records. By proper proportioning of the slot, it will be noted, as shown by the dashed lines of Fig. 5, that it is possible to move the transducer so that either needle will engage the corresponding type record at the same distance from the pivot point for lateral movement of the arm, thus minimizing tracking error on the record. It will be readily understood by those skilled in the art that this embodiment is adaptable to be moved by a lever arrangement similar to my second embodiment. The two arrangements of levers for this embodiment are best shown in Figs. 6 and 7. Fig. 6 shows the lever 69 pivoted to the arm at one end 70 and to a link 71 at its mid portion. The link is pivoted to the slider as in the previous embodiment. The counterweight 72 is carried at the other end of the lever 69 as before to shift the center of gravity of the arm. The lever in Fig. 7 is different from that of Fig. 6 only in that it is a different class lever. However, in this embodiment, the counterweight arm 69, since it is pivoted near the upper surface of the pickup arm 7, requires a much smaller slot in the arm. Moreover, since the shift of the pickup arm is in the same direction as that of the counterweight, the weight may be reduced to obtain the same effect as a heavier weight in the embodiment of Fig. 6.

Having thus described my invention in three embodiments thereof, I am aware that numerous and extensive departures may be made therefrom without departing from the spirit or scope of my invention.

I claim:

1. Apparatus of the class described comprising a pickup arm, transducer means having a plurality of needles extending therefrom associated with said arm, means to associate said transducer pivotally with said pickup arm, a slider mechanism, said slider mechanism comprising a resilient member, and a rigid member, said resilient member being fixed to said rigid member and extending outward therefrom, means by which said rigid member is slidably anchored to said pickup arm, said resilient member being movably engaged with said transducer means and adapted to move from one side to the other thereof, whereby said transducer is tiltably shifted on movement of said slider mechanism relative to said pickup arm to cause said needles to be extended alternately.

2. In a phonograph apparatus including a pickup arm, a transducer carried by said arm, a plurality of needles extending from said transducer, means to associate said transducer pivotally with said pickup arm, a slider mechanism slidably anchored to said pickup arm in movable engagement with the transducer, said slider mechanism including a counterweight member, said counterweight member being movable with said slider mechanism, said movement being effective to alter the position of the engagement of said slider mechanism with said transducer whereby said transducer is tilted, said movement also being effective to shift said counterweight whereby the pressure on said transducer is changed.

3. Apparatus of the class described comprising a pickup arm, a transducer, means to connect said transducer pivotally with said pickup arm, said transducer being pivoted on an axis located between its ends, slider mechanism slidably disposed on said pickup arm and having an extension resiliently engaging said transducer, said slider being slidable between a plurality of positions, said extension being thereby carried slidably across said transducer to engage said transducer on opposite sides of said axis whereby said transducer is moved to a plurality of positions.

4. In a phonograph having a base and a pickup arm mounting post on said base, in combination, a pickup arm, means connecting said arm pivotally to said post on a horizontal pivot axis, a transducer movably mounted on said arm on a pivotal axis located between the ends of said transducer, slider mechanism slidably engaged with said pickup arm and having a resilient finger engaging said transducer, said slider mechanism being slidable relative to said arm to a plurality of positions, said finger being carried across said transducer to opposite sides of said transducer, but remaining in spring pressed engagement therewith whereby said transducer is moved to a plurality of positions.

5. In a phonograph having a base and a pickup arm mounting post on said base; in combination, a pickup arm, means connecting said arm pivotally to said post on a horizontal pivot axis, a transducer movably mounted on said arm on a pivotal axis located between the ends of said transducer, slider mechanism slidably engaged with said pickup arm and having a resilient finger engaging said transducer, said slider mechanism being slidably relative to said arm to a plurality of positions, said finger being carried across said transducer to opposite sides of said axis of said transducer, but remaining in spring pressed engagement therewith whereby said transducer is moved to a plurality of positions, and counterweight means in connection with said slider mechanism and being movable with respect to said horizontal pivot axis of said arm as said slider is moved, whereby the center of gravity of said arm is moved with respect to said horizontal axis.

6. The apparatus of claim 3 in which a lever means is pivotally attached to the pickup arm and is connected to the slider mechanism whereby said lever means is effective to operate said slider mechanism.

7. The apparatus of claim 3 in which a lever mechanism is pivotally attached to the pickup arm and connected to the slider mechanism, counterweight means on said lever mechanism adapted to be moved therewith, movement of said counterweight and said lever mechanism being effective to slide said slider mechanism.

8. To apparatus of claim 3 in which the slider mechanism is pivotally connected to a mounting post, a counterweight on said pickup arm, movement of said pickup arm relative to said slider mechanism thereby being effective to shift said extension over said transducer and to shift the center of gravity of said pickup arm relative to the pivotal connection at the mounting post.

9. The apparatus of claim 3 in which the slider mechanism is pivotally mounted on a mounting post, lever means pivotally attached to said pickup arm and connected to said slider mechanism, movement of said lever means being thereby effective to slide said pickup arm relative to said slider mechanism to cause said transducer to be moved to its plurality of positions.

10. The apparatus of claim 9 in which a counterweight is mounted on said lever means to shift the center of gravity of said pickup arm relative to said mounting post.

JAMES E. VISTAIN, Jr.

REFERENCES CITED

The following references are of record in the file of this patent:

UNITED STATES PATENTS

| Number | Name | Date |
|---|---|---|
| 842,897 | Macdonald | Feb. 5, 1907 |
| 874,973 | Macdonald | Dec. 31, 1907 |
| 1,034,387 | Jetter | July 20, 1912 |
| 1,067,530 | Lindstrom | July 15, 1913 |
| 1,132,092 | Hesselius | Mar. 16, 1915 |
| 1,992,893 | Thomas | Feb. 26, 1935 |
| 2,113,401 | Goldsmith | Apr. 5, 1938 |
| 2,326,625 | Di Toro | Aug. 10, 1943 |
| 2,410,607 | Moore | Nov. 5, 1946 |
| 2,446,324 | Di Ghilini | Aug. 3, 1948 |